United States Patent
Desclos et al.

(10) Patent No.: US 10,355,767 B2
(45) Date of Patent: Jul. 16, 2019

(54) NETWORK REPEATER SYSTEM

(71) Applicant: Ethertronics, Inc., San Diego, CA (US)

(72) Inventors: Laurent Desclos, San Diego, CA (US); Jeffrey Shamblin, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 16/245,885

(22) Filed: Jan. 11, 2019

(65) Prior Publication Data

US 2019/0149220 A1    May 16, 2019

Related U.S. Application Data

(63) Continuation of application No. 15/423,571, filed on Feb. 2, 2017, now abandoned.

(60) Provisional application No. 62/290,419, filed on Feb. 2, 2016.

(51) Int. Cl.
| | |
|---|---|
| *H04B 7/155* | (2006.01) |
| *H01Q 1/24* | (2006.01) |
| *H01Q 3/26* | (2006.01) |
| *H04B 7/0426* | (2017.01) |

(52) U.S. Cl.
CPC ............. *H04B 7/155* (2013.01); *H01Q 1/246* (2013.01); *H01Q 3/2611* (2013.01); *H04B 7/043* (2013.01)

(58) Field of Classification Search
CPC .... H01Q 3/2605; H01Q 1/246; H01Q 3/2611; H01Q 25/00; H01Q 25/04
See application file for complete search history.

(56) References Cited

U.S. PATENT DOCUMENTS

| | | |
|---|---|---|
| 6,765,536 B2 | 7/2004 | Phillips et al. |
| 6,987,493 B2 | 1/2006 | Chen |
| 7,068,234 B2 | 6/2006 | Sievenpiper |
| 7,215,289 B2 | 5/2007 | Harano |
| 7,830,320 B2 | 11/2010 | Shamblin |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Deslos et al. |
| 9,755,580 B2 | 9/2017 | Desclos et al. |

(Continued)

*Primary Examiner* — Keith Ferguson
(74) *Attorney, Agent, or Firm* — Dority & Manning, P.A.

(57) ABSTRACT

A system is described where antenna beam steering techniques are implemented to optimize time and frequency channel resources in wireless communication systems where repeaters are used. Beam steering modes of the antenna systems in the repeaters as well as the nodes are optimized to improve system capacity and load balancing. Client devices in a wireless LAN system can be configured to work as repeaters, with the repeaters containing a beam steering capability. The beam steering capability can be implemented in one or multiple nodes and repeaters in the communication system.

11 Claims, 8 Drawing Sheets

(56) References Cited

U.S. PATENT DOCUMENTS

2010/0117913 A1     5/2010   Jung
2015/0295310 A1*   10/2015   Hazelton ............ H04B 7/15507
                                                                         342/369

* cited by examiner

Beam Steering at Access Point and Repeaters.
Clients have passive antennas

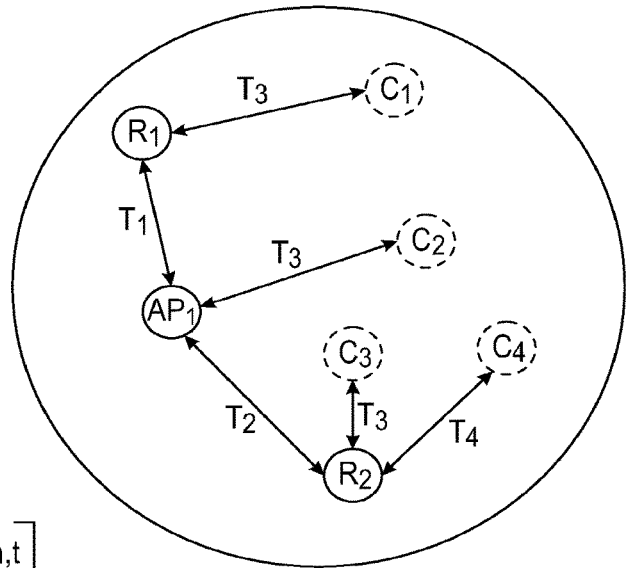

$$\begin{bmatrix} \text{System Control Matrix} \quad S_{m,n,t} \\ m = \text{AP Mode Number} \\ n = \text{Repeater Mode Number} \\ t = \text{Time Stamp} \end{bmatrix}$$

- Link Quality between AP and Clients Measured
- Link Quality between Repeaters and Clients Measured
- Modes at Repeaters that improve Link Quality Determined
- Modes at Repeater that Decrease Interference Determined

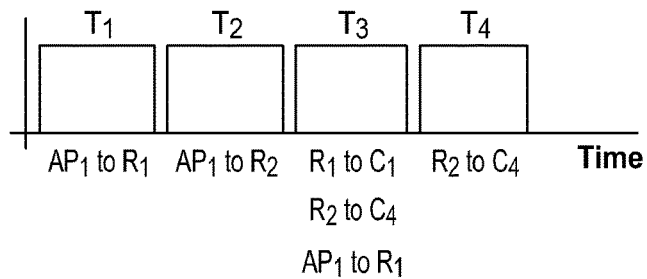

FIG. 1

Beam Steering at Access Point, Repeater and Clients

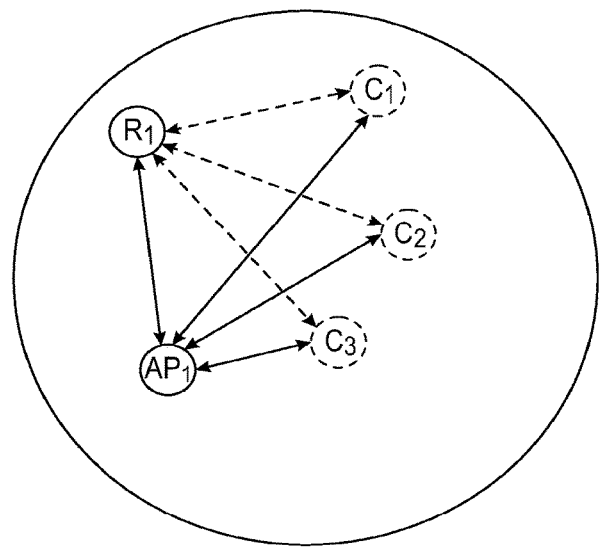

System Control Matrix $S_{m,n,p,t}$
m = AP Mode Number
n = Repeater Mode Number
p = Client Mode Number
t = Time Stamp

- Link Quality between AP and Clients Measured
- Link Quality between Repeaters and Clients Measured
- Modes at Repeater and Clients that improve Link Quality Determined
- Modes at Repeater and Clients that Decrease Interference Determined

FIG. 2

Beam Steering at Access Point, Repeater and Clients
Clients Enabled with Repeater Functionality

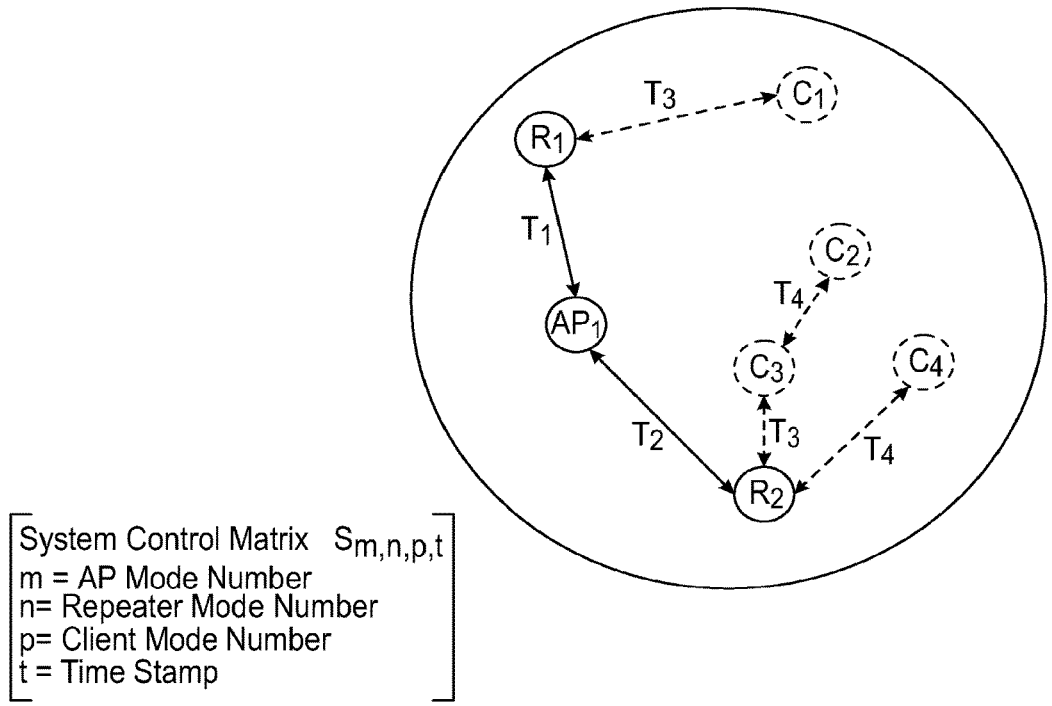

$$\begin{bmatrix} \text{System Control Matrix} \quad S_{m,n,p,t} \\ m = \text{AP Mode Number} \\ n = \text{Repeater Mode Number} \\ p = \text{Client Mode Number} \\ t = \text{Time Stamp} \end{bmatrix}$$

- Link Quality between AP and Clients Measured
- Link Quality between Repeaters and Clients Measured
- Modes at Repeaters that improve Link Quality Determined
- Modes at Repeater that Decrease Interference Determined

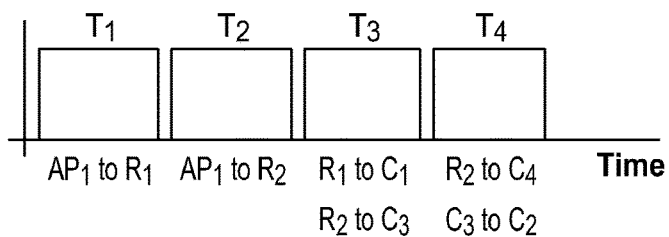

FIG. 3

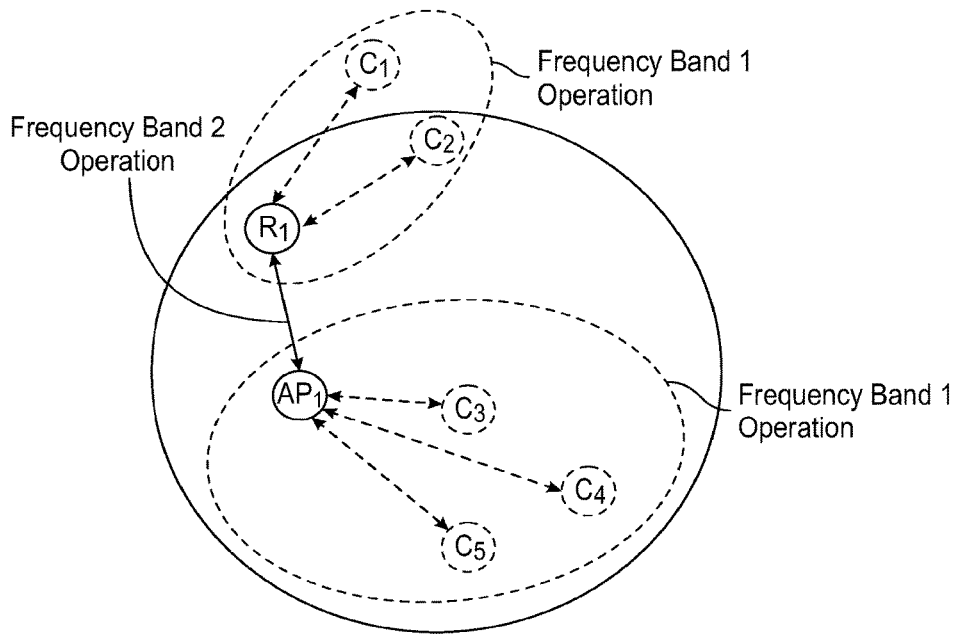
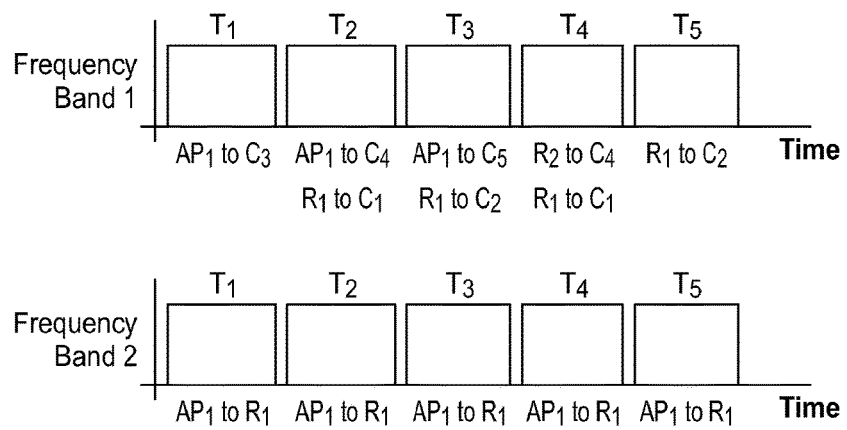
FIG. 7

Simultaneous Operation at Same Frequency Channel Feasible for $AP_1$ to $C_4$ and $R_1$ to $C_1$ due to Proper Mode Selection for Beam Steering Systems at $AP_1$ and $R_1$

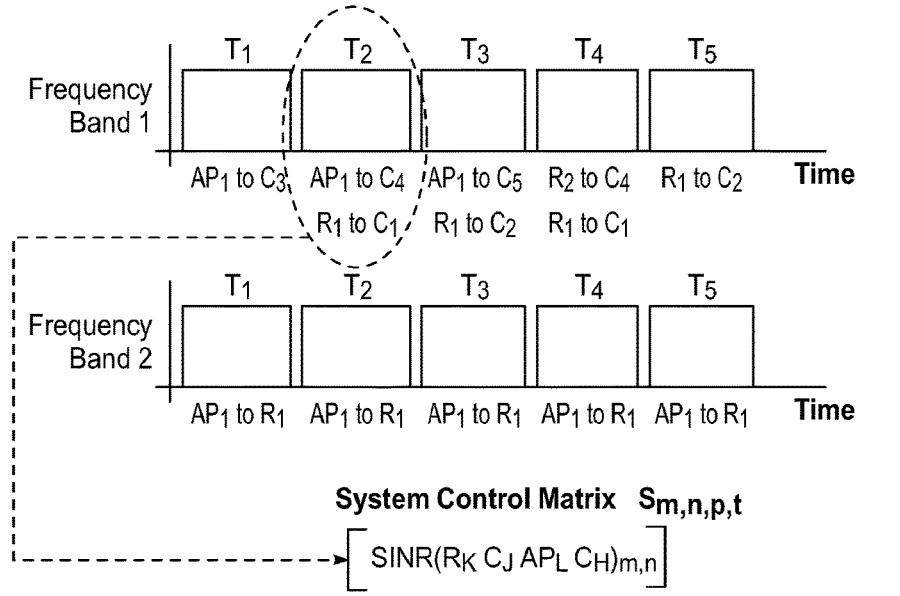

System Control Matrix $S_{m,n,p,t}$ $$\left[ SINR(R_K\ C_J\ AP_L\ C_H)_{m,n} \right]$$

Where
  $m$ = AP Mode Number
  $n$ = Repeater Mode Number
  $K$ = Repeater Number
  $J$ = Client Number Associated with Repeater
  $L$ = Access Point Number
  $H$ = Client Number Associated with AP Generalized System Control Matrix Parameter CL Refers to Communication Link and this Parameter can be any Metric that Characterizes the Communication Link

System Control Matrix $S_{m,n,p,t}$ $$\left[ CL(R_K\ C_J\ AP_L\ C_H)_{m,n} \right]$$

FIG. 8

NETWORK REPEATER SYSTEM

CROSS-REFERENCE TO RELATED APPLICATIONS

The present application is a continuation of U.S. application Ser. No. 15/423,571, having a filing date of Feb. 2, 2017, which claims the benefit of U.S. Provisional Application Ser. No. 62/290,419, having a filing date of Feb. 2, 2016.

the entire contents of which are hereby incorporated by reference.

BACKGROUND

Field of the Invention

This invention relates generally to the field of wireless communication; and more particularly, to a repeater system utilizing beam steering antenna systems for use in communication systems such as a Local Area Network (LAN) or cellular communication network.

Description of the Related Art

Repeater circuits are used in cellular and WLAN communication systems to improve range and to minimize dropped connections due to multi-path. A repeater works by receiving a signal from a communication node and re-transmitting the signal on the same frequency channel or a second frequency channel. With a repeater positioned at a distance from the communication node that represents 75 to 80 percent of the maximum range for communication, and with the repeater utilizing the same transmit power and antenna gain then a near doubling of range can be achieved for an equivalent propagation channel. The area or volume that a communication system provides coverage for can be increased by installing one or multiple repeaters that work in conjunction with the communication node. For example adding a repeater to operate in conjunction with a Wireless Local Area Network (WLAN) access point used to provide connectivity in a region will result in extended coverage throughout a building. A wireless repeater circuit does not need a cabled connection to a communication node, easing the installation of repeaters in a communication system. Of course DC power will need to be supplied to power the transceivers used to comprise the repeater.

This extended range comes at the expense of reduced system capacity if the re-broadcast signal occurs on the same frequency channel. If separate frequency channels are used for reception and transmission then frequency channel usage is impacted, again resulting in reduced system capacity. Another drawback with using repeaters is the introduction of another transmission source which can result in another interference source that needs to be considered.

Current and future WLAN access points and client communication devices will require higher performance from the antenna systems to improve system capacity and increase reliability of the connection. As new generations of handsets, gateways, and other wireless communication devices become embedded with more applications and the need for bandwidth becomes greater, new antenna systems will be required to optimize link quality. Specifically, better control of the radiated field from the antenna system on the mobile or client side of the communication link along with the access point will be required to provide better communication link quality for an antenna system tasked to provide higher throughput and a more reliable link.

Antenna beam steering techniques are well known and utilized on the base terminal side of the cellular communication link, and these beam steering techniques are also implemented on some WLAN access points. However, beam steering techniques are currently missing from small form factor repeater devices used in WLAN applications due to the limited space allowed for the antenna system. Along with repeaters current cell phones, smart phones, tablet devices, and laptops are not large enough nor have the internal volume available to support multi-element antenna arrays needed to effectuate traditional beam steering techniques.

Commonly owned U.S. Pat. Nos. 7,911,402; 8,362,962; 8,648,755; and 9,240,634 describe a beam steering technique wherein a single antenna is capable of generating multiple radiating modes. This is effectuated with the use of offset parasitic elements that alter the current distribution on the driven antenna as the reactive load on the parasitic is varied. This beam steering technique where multiple modes are generated is a modal antenna technique, and an antenna configured to alter radiating modes in this fashion will be referred to here as a modal antenna. This antenna architecture solves the problem associated with a lack of volume in mobile devices to accommodate antenna arrays needed to implement more traditional beam steering hardware.

BRIEF DESCRIPTION OF THE DRAWINGS

FIG. 1 illustrates a communication system containing an access point, two repeaters, and four clients. The access point and both repeaters have antenna beam steering capability. A system control matrix is described where the communication link quality between the access point and clients, the access point an repeaters, and the repeaters and the clients is measured and stored for each radiation mode or beam state of the beam steering antenna systems in the access point and repeaters.

FIG. 2 illustrates a communication system containing an access point, one repeater, and three clients. The access point, repeater, and clients have antenna beam steering capability. A system control matrix is described where the communication link quality between the access point and clients, the access point an repeaters, and the repeaters and the clients is measured and stored for each radiation mode or beam state of the beam steering antenna systems in the access point, repeater, and clients.

FIG. 3 illustrates a communication system containing an access point, two repeaters, and four clients. The access point, repeaters, and clients have antenna beam steering capability. The system control matrix is surveyed to find pairs of communication links that can operate at the same frequency or channel simultaneously without interference by proper radiation mode selection. Radiation modes for the antenna systems associated with the access point, repeaters, and clients are chosen to provide minimal interference with other portions of the communication system.

FIG. 7 illustrates a communication system containing an access point, a repeater, and five clients. The access point and repeater are capable of operation on two frequency bands, labeled frequency Band 1 and frequency Band 2. Frequency Band 2 is used to communicate between the access point and repeater while frequency Band 1 is used to communicate between the repeater and clients and the access point and clients. The access point and repeater have antenna beam steering capability. The clients may or may not have beam steering capability. The system control matrix is surveyed to find pairs of communication links that can operate at the same frequency or channel simultaneously without interference by proper radiation mode selection. Radiation modes for the antenna systems associated with the access point, repeaters, and clients are chosen to provide minimal interference with other portions of the communication system.

FIG. 8 illustrates a system control matrix used to relate beam steering modes of the access point and repeater in a communication system.

DESCRIPTION OF THE INVENTION

Figure 4:
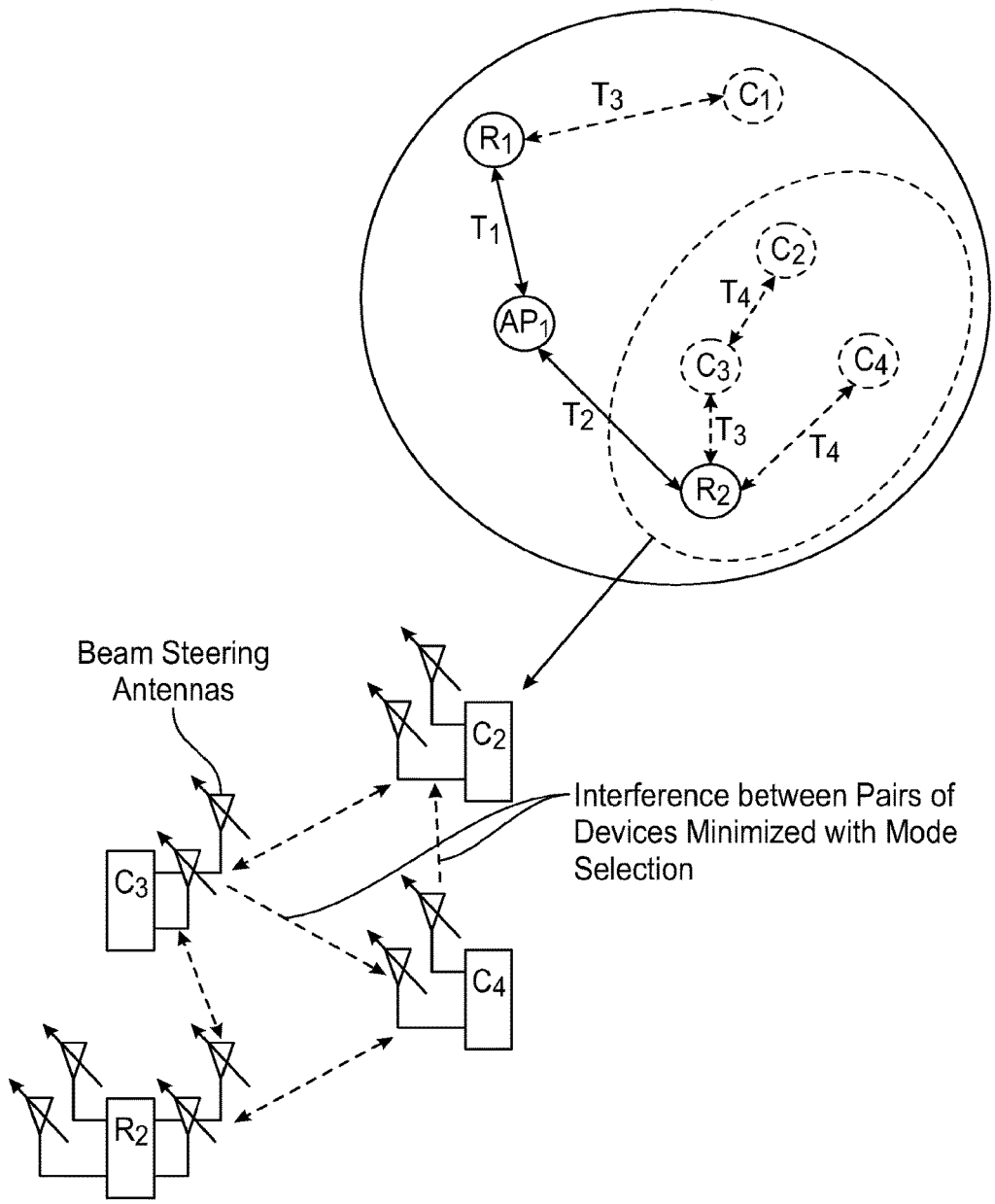
FIG. 4 illustrates a communication system containing an access point, two repeaters, and four clients. The access point, repeaters, and clients have antenna beam steering capability. Client C3 is capable of operating as a repeater when commanded by the system controller.

A communication system is described, utilizing one or multiple repeaters along with beam steering antenna systems in both communication nodes and repeaters to optimize system capacity and to provide load balancing improvement to the network. Client or mobile devices used on the network can also contain antenna beam steering systems to improve network performance. Use of this new technique can result in increased communication range due to the use of repeaters along with the ability to dynamically change the direction of peak gain of the antennas in the communication nodes and repeaters. An increase in throughput as well as improved link reliability is realized due to an increased SINR resulting from an optimized antenna system.

This instant disclosure concerns a system where antenna beam steering techniques are implemented to optimize time and frequency channel resources in wireless communication systems where repeaters are used. Beam steering modes of the antenna systems in the repeaters as well as the nodes are optimized to improve system capacity and load balancing. Client devices in a wireless LAN system can be configured to work as repeaters, with the repeaters containing a beam steering capability. The beam steering capability can be implemented in one or multiple nodes and repeaters in the communication system.

In one embodiment, a communication node containing a transceiver and antenna system such as a WLAN access point is connected to one or multiple repeaters, with the repeaters used to extend communication range. Each repeater contains a transmitter with antenna coupled to it and a receiver with a second antenna connected to it. One or more communication devices termed client devices are positioned within communication range of the access point and/or one or multiple repeaters. Each client device contains a transceiver with antenna system with the client devices comprising the second end of a communication link. The antenna systems associated with the access point and one or multiple of the repeaters are comprised of Modal antennas, with the Modal antenna being capable of generating multiple radiation patterns from a single port antenna. An algorithm is implemented with the Modal antenna to provide a capability of surveying a channel quality indicator (CQI) metric such as Signal to Interference and Noise Ratio (SINR), Receive Signal Sensitivity Indicator (RSSI), Modulation Coding Scheme (MCS), or similar metric obtained from the baseband processor of the communication system to provide the capability to sample radiation patterns and make a decision in regards to operating on the optimal radiation pattern or mode based on the CQI. The communication link quality between the access point and each client as well as the communication link quality between the access point and the one or multiple repeaters for each Mode of the Modal antennas associated with the access point and the repeaters is measured and stored in memory. The communication link quality between the one or multiple repeaters and each client is measured and stored in memory. The algorithm uses the stored communication link quality information to determine the radiation Modes of the Modal antennas associated with the access point and the one or multiple repeaters to optimize the communication links between the access point and clients and repeaters as well as the repeaters and the clients. The optimization can be performed to improve Throughput between the communication devices in this total system as well as communication range and capacity. Radiation Modes can be selected to allow for simultaneous communication between access point and clients and repeaters and clients at the same frequency channel, where radiation Modes are selected to decrease interference between transceivers in the communication nodes and clients.

In another embodiment, the communication system as previously described is implemented where Modal antennas are also extended for use on one or multiple client devices. The communication link quality between the access point and each client as well as the communication link quality between the access point and the one or multiple repeaters for each Mode of the Modal antennas associated with the access point and the repeaters is measured and stored in memory. The communication link quality between the one or multiple repeaters and each client is measured and stored in memory. The algorithm uses the stored communication link quality information to determine the radiation Modes of the Modal antennas associated with the access point, the one or multiple repeaters, and the one or multiple client devices to optimize the communication links between the access point and clients and repeaters as well as the repeaters and the clients. The optimization can be performed to improve Throughput between the communication devices in this total system as well as communication range and capacity. Radiation Modes can be selected to allow for simultaneous communication between access point and clients and repeaters and clients at the same frequency channel, where radiation Modes are selected to decrease interference between transceivers in the communication nodes and clients.

In another embodiment, the communication system as previously described is implemented where Modal antennas are implemented in the access point, one or multiple repeaters, and one or multiple client devices. One or multiple client devices are configured with a repeater mode, where the transceiver is configured with a transmitter with a first antenna and receiver with a second antenna. If one or more clients in the communication network cannot make or maintain a communication link, with these clients being termed under-served, with the access point or repeaters then a client with a stable communication link with the access point or a repeater can revert to a repeater mode where the client receives a signal from the access point or a repeater and transmit the signal to the under-served client. If the client that is operating in repeater mode has Modal antennas for the transmit and/or receive function, radiation Modes for the client operating in repeater mode as well as the access point and repeaters in the communication system can be selected to allow for simultaneous communication between access point and clients and repeaters and clients at the same frequency channel, where radiation Modes are selected to decrease interference between transceivers in the communication nodes and clients.

In another embodiment, load balancing of the network can be improved by use of the Modal antennas associated with the access point, repeaters, and/or client devices. The network is defined as an access point, one or multiple repeaters, and one or multiple clients. Modal antennas are associated with one or multiple nodes of this network and the radiation Modes from one or multiple Modal antennas can be selected to load balance the network. For example, radiation modes can be selected on the Modal antenna associated with a repeater to communicate with one client in the network, with the access point communicating with the remaining clients in the network. To improve the load balancing process modes of the Modal antenna can be surveyed and the mode selected to communicate with additional clients in the network to remove clients from the access point link. In the overall network radiation Modes can be selected to allow for simultaneous communication between access point and clients and repeaters and clients at the same frequency channel, where radiation Modes are selected to decrease interference between transceivers in the communication nodes and clients.

Now turning to the drawings, FIG. 1 illustrates a communication system containing an access point (AP1), two repeaters (R1; R2), and four clients (C1; C2; C3; C4). The access point and both repeaters have antenna beam steering capability. A system control matrix is described where the communication link quality between the access point and clients (first link quality metric), the access point and repeaters, and the repeaters and the clients (second link quality metric) is measured and stored for each radiation mode or beam state of the beam steering antenna systems in the access point and repeaters.

FIG. 2 illustrates a communication system containing an access point (AP1), one repeater (R1), and three clients (C1; C2; C3). The access point, repeater, and clients have antenna beam steering capability. A system control matrix is described where the communication link quality between the access point and clients (first link quality metric), the access point an repeaters, and the repeaters and the clients (second link quality metric) is measured and stored for each radiation mode or beam state of the beam steering antenna systems in the access point, repeater, and clients.

FIG. 3 illustrates a communication system containing an access point (AP1), two repeaters (R1; R2), and four clients (C1; C2; C3; C4). The access point, repeaters, and clients have antenna beam steering capability. The system control matrix is surveyed to find pairs of communication links that can operate at the same frequency or channel simultaneously without interference by proper radiation mode selection. Radiation modes for the antenna systems associated with the access point, repeaters, and clients are chosen to provide minimal interference with other portions of the communication system.

FIG. 4 illustrates a communication system containing an access point (AP1), two repeaters (R1; R2), and four clients (C1; C2; C3; C4). The access point, repeaters, and clients have antenna beam steering capability. Client C3 is capable of operating as a repeater when commanded by the system controller.

Figure 5:
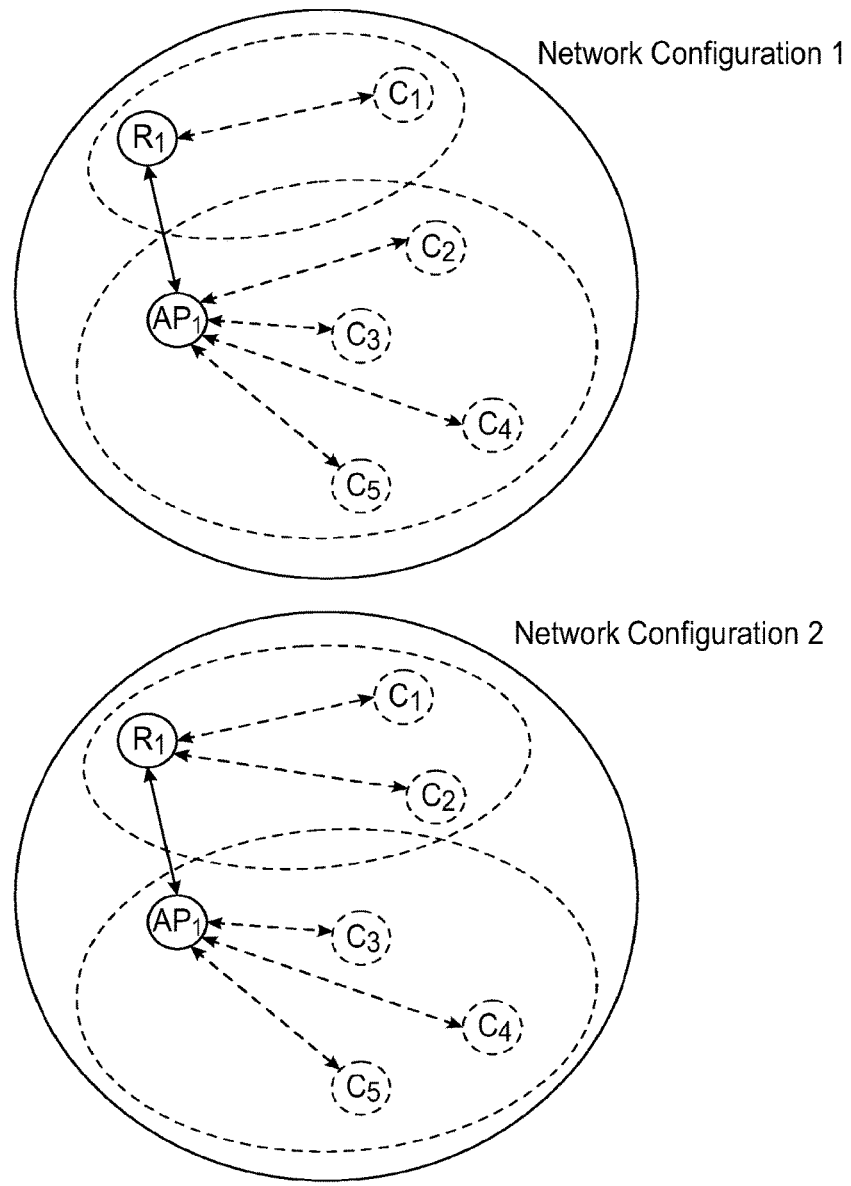
FIG. 5 illustrates a communication system where two network configurations are shown. The two network configurations show different sets of clients served by the repeater, with this capability of varying which client is served by the repeater and access point used to load balance the communication system.

FIG. 5 illustrates a communication system where two network configurations are shown. The two network configurations show different sets of clients served by the repeater, with this capability of varying which client is served by the repeater and access point used to load balance the communication system.

Figure 6:
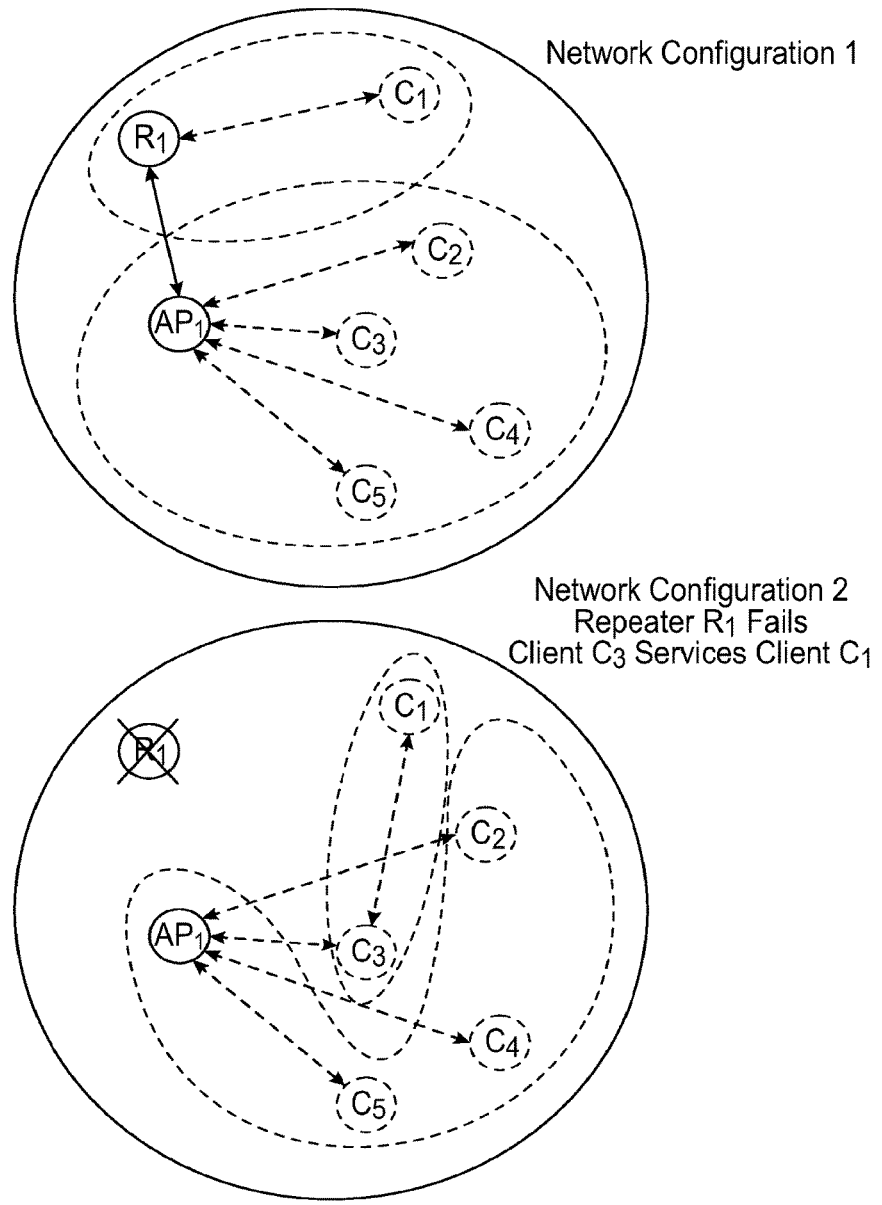
FIG. 6 illustrates a communication network fault correction methodology wherein a client is enabled to operate as a repeater when the repeater in the system fails. Client C3 switches from client mode to repeater mode to provide a communication link from the access point to client C1.

FIG. 6 illustrates a communication network fault correction methodology wherein a client is enabled to operate as a repeater when the repeater in the system fails. Client C3 switches from client mode to repeater mode to provide a communication link from the access point to client C1.

FIG. 7 illustrates a communication system containing an access point (AP1), a repeater (R1), and five clients (C1; C2; C3; C4; C5). The access point and repeater are capable of operation on two frequency bands, labeled frequency Band 1 and frequency Band 2. Frequency Band 2 is used to communicate between the access point and repeater while frequency Band 1 is used to communicate between the repeater and clients and the access point and clients. The access point and repeater have antenna beam steering capability. The clients may or may not have beam steering capability. The system control matrix is surveyed to find pairs of communication links that can operate at the same frequency or channel simultaneously without interference by proper radiation mode selection. Radiation modes for the antenna systems associated with the access point, repeaters, and clients are chosen to provide minimal interference with other portions of the communication system.

FIG. 8 illustrates a system control matrix used to relate beam steering modes of the access point (node) and repeater in a communication system.

Accordingly, a communication system is described comprising:

a first node configured with a baseband unit and a transceiver, with said transceiver containing one or multiple transmit/receive ports;

one or multiple antennas connected to the transceiver, with one antenna connected to each transmit/receive port;

a processor containing an algorithm;

a repeater circuit separately located from the first node consisting of a receive circuit and a transmit circuit, with said receive circuits and transmit circuits containing one or multiple transmit/receive ports with one antenna connected to each receive circuit and transmit circuit port;

a plurality of client devices, with each client device comprised of a baseband unit and a transceiver, with said transceiver containing one or multiple transmit/receive ports;

one or multiple antennas connected to the transceiver of each client device, with one antenna connected to each transmit/receive port;

the algorithm associated with the first node accesses a link quality metric associated with the communication link between the first node and the plurality of client devices, the algorithm accesses a link quality metric associated with the communication link between the repeater circuit and the plurality of client devices, one antenna connected to the transceiver of the first node is a Modal antenna, with said Modal antenna capable of generating multiple radiation patterns, with the radiation patterns referred to as radiation modes, and with each radiation mode being different from the other radiation modes, one antenna connected to the receive circuit of the repeater is a Modal antenna, the algorithm resident in the processor of the first node is configured to survey one or multiple metrics from the baseband unit and uses the one or multiple metrics to select the radiation mode of the Modal antenna in the first node and in the repeater receive circuit to determine whether the first node or repeater provides optimal performance for each of the plurality of clients.

In other embodiments, the communication system is configured with one antenna connected to the transmit circuit of the repeater is a Modal antenna; all antennas connected to the receive circuit of the repeater are passive antennas; the algorithm resident in the processor of the first node is configured to survey one or multiple metrics from the baseband unit and uses the one or multiple metrics to select the radiation mode of the Modal antenna in the first node and in the repeater transmit circuit to determine whether the first node or repeater provides optimal performance for each of the plurality of clients.

In other embodiments, the communication system is configured such that one antenna connected to the transmit circuit of the repeater is a Modal antenna and one antenna connected to the receive circuit of the repeater is a Modal antenna; the algorithm resident in the processor of the first node is configured to survey one or multiple metrics from the baseband unit and uses the one or multiple metrics to select the radiation mode of the Modal antenna in the first node and in the repeater receive circuit and transmit circuit to determine whether the first node or repeater provides optimal performance for each of the plurality of clients.

In other embodiments, the communication system is configured with one or multiple antennas connected to the first node and one or multiple antennas connected to the transmit circuit of the repeater circuit and one or multiple antennas connected to the receive circuit of the repeater circuit are Modal antennas; the algorithm resident in the processor of the first node is configured to survey one or multiple metrics from the baseband unit and uses the one or multiple metrics to select the radiation mode of all Modal antennas in the communication system to provide optimal performance for each of the plurality of clients.

In other embodiments, the communication system is configured such that two or more repeater circuits are separated from the first node, with one or more of the repeater circuits containing Modal antennas connected to the receive and/or transmit circuits of said repeaters.

In other embodiments, the communication system is configured such that the algorithm surveys communication link metrics between the first node and the plurality of clients and the repeater and the plurality of clients to load balance the communication system comprising the first node, repeater, and plurality of clients.

In other embodiments, the communication system is configured such that the algorithm surveys communication link metrics between the first node and the plurality of clients and the repeater and the plurality of clients to load balance the communication system comprising the first node, repeater, and plurality of clients.

In other embodiments, the communication system is configured such that the algorithm is configured to survey one or multiple metrics from the baseband unit associated with the communication link between the node and a plurality of clients and the repeater and a plurality of clients and uses the one or multiple metrics to select the radiation mode of all Modal antennas in the communication system to provide concurrent transmission and/or reception between the node and one or multiple clients and the repeater and one or multiple clients at the same frequency.

In other embodiments, the communication system is configured such that the algorithm is configured to survey one or multiple metrics from the baseband unit associated with the communication link between the node and a plurality of clients and two or more repeaters and a plurality of clients and uses the one or multiple metrics to select the radiation mode of all Modal antennas in the communication system to provide concurrent transmission and/or reception between the node and one or multiple clients and the two or more repeaters and one or multiple clients at the same frequency.

In other embodiments, the communication system is configured such that a fault correction process is implemented to improve communication system performance when a repeater circuit has a partial or complete failure; when a failure in the repeater circuit is detected one of the plurality of clients is commanded by the algorithm to serve as a repeater to provide improved communication link performance to one or a plurality of clients; the client selected to operate as a repeater does not have a Modal antenna associated with it.

In yet other embodiments, the communication system is configured such that the client selected to operate as a repeater has a Modal antenna on the transmit circuit, receive circuit, or both transmit and receive circuits.

The "transmit/receive ports" may be collectively referred to as "communication ports".

The transmit/receive ports of the first node (ex: access point) may be termed "first communication ports".

Antennas associated with the first node may be referred to as "first antennas".

The transmit/receive ports of the repeater may be termed "second communication ports".

Antennas associated with the repeater may be referred to as "second antennas".

The transmit/receive ports of a client device may be termed "third communication ports".

Antennas associated with a client device may be referred to as "third antennas".

A link quality metric associated with a communication link between the first node and each of the plurality of client devices may be referred to as a "first link quality metric".

A link quality metric associated with a communication link between the repeater and each of the plurality of client devices may be referred to as a "second link quality metric".

The invention claimed is:

1. A communication system comprising:
a first node, the first node including:
a first baseband unit and a first transceiver, said first transceiver comprising one or more first communication ports; and
one or more first antennas, each of the one or more first antennas connected to one of the one or more first communication ports;
a processor coupled to the first node and configured to execute an algorithm;
a repeater, the repeater being in communication with the first node and adapted to service a communication network thereof, the repeater including:
a receive circuit and a transmit circuit, each of the receive and transmit circuits comprising one or more second communication ports; and
one or more second antennas, each of the one or more second antennas connected to one of the one or more second communication ports, wherein at least one of the second antennas comprises a modal antenna, the modal antenna capable of configuration in one of a plurality of possible antenna modes, wherein the modal antenna comprises a distinct radiation pattern characteristic when configured in each of the plurality of possible modes;
a plurality of client devices, each of the client devices including:
a baseband unit;
a transceiver, the transceiver comprising one or more third communication ports; and
one of more third antennas connected to the transceiver, each of the one or more third antennas connected to one of the one or more third communication ports;
wherein the algorithm comprises:
accessing a first link quality metric associated with a communication link between the first node and each of the plurality of client devices,
accessing a second link quality metric associated with a communication link between the repeater and each of the plurality of client devices,
surveying the first and second link quality metrics; and
based on the first and second link quality metrics, selecting the antenna mode for configuring the modal antenna, wherein the antenna mode is selected to improve performance of the communication network.

2. The communication system of claim 1 wherein the modal antenna is connected to the transmit circuit of the repeater.

3. The communication system of claim 2, wherein each of the antennas coupled to the receive circuit of the repeater comprises a passive antenna.

4. The communication system of claim 2, wherein, for each of the plurality of client devices, the system is configured to select one of the first node and the repeater for communicating with the client device, wherein the selecting the one of the first node and the repeater is based on the first and second link quality metrics.

5. The communication system of claim 2, comprising a plurality of modal antennas, each of the modal antennas connected to one of the second communication ports of the repeater.

6. The communication system of claim 5, one of the plurality of modal antennas being coupled to the receive circuit of the repeater.

7. The communication system of claim 1 wherein the algorithm comprises: selecting the antenna mode of the modal antenna for load balancing the communication network.

8. The communication system of claim 1, wherein a fault correction process is implemented to improve communication system performance when a repeater circuit has a partial or complete failure; when a failure in the repeater circuit is detected one of the plurality of clients is commanded by the algorithm to serve as a repeater to provide improved communication link performance to one or a plurality of other clients.

9. The communication system of claim 8 wherein the client selected to operate as a repeater comprises a modal antenna connected to a transmit circuit, receive circuit, or combination thereof.

10. The communication system of claim 1, wherein at least one of the one or more first antennas comprises a modal antenna, the modal antenna capable of configuration in one of a plurality of possible antenna modes, wherein the modal antenna comprises a distinct radiation pattern characteristic when configured in each of the plurality of possible modes.

11. The communication system of claim 1 further comprising a second repeater, the second repeater including at least one modal antenna and being configurable in one of a plurality of possible antenna modes, the modal antenna exhibiting a distinct radiation pattern characteristic in each of the plurality of possible antenna modes, wherein the communication system is adapted to configure the at least one modal antenna of the second repeater for servicing selected client devices of the plurality of client device and optimizing performance of the communication network.

* * * * *